United States Patent [19]
Armelin

[11] 3,916,749
[45] Nov. 4, 1975

[54] ROTARY CUTTING AND FOLD MARKING TOOL

[76] Inventor: Georges Edouard Armelin, 6, rue Auguste Rodin, La Source, Orleans, France, 45018

[22] Filed: June 5, 1973

[21] Appl. No.: 367,250

[52] U.S. Cl. .............. 83/835; 83/663; 76/101 A; 93/58.1; 93/58.2 R
[51] Int. Cl.² ........................................ B26D 1/36
[58] Field of Search .............. 83/346, 835, 663; 76/101 A; 93/58.1, 58.2 R

[56] References Cited
UNITED STATES PATENTS

| 1,511,555 | 10/1924 | Yngve | 76/101 A |
| 1,770,157 | 7/1930 | Humphries | 76/101 A |
| 2,791,248 | 5/1957 | Beale | 83/835 |
| 2,810,329 | 10/1957 | Schmidt et al. | 93/58.2 R |
| 3,209,633 | 10/1965 | Doerman | 83/346 |
| 3,415,148 | 12/1968 | O'Brien | 83/674 X |

FOREIGN PATENTS OR APPLICATIONS

| 1,503,962 | 8/1969 | Germany | 83/835 |

Primary Examiner—Willie G. Abercrombie
Attorney, Agent, or Firm—Robert E. Burns; Emmanuel J. Lobato; Bruce L. Adams

[57] ABSTRACT

A rotary cutting or fold line marking tool has a peripheral surface equipped with cutting or indenting blades, as the case may be. The blades each consist of an underlying rib or land on which has been electrodeposited a wear resistant surface of chromium which is built up on the crest of the rib to an increased thickness.

4 Claims, 2 Drawing Figures

ROTARY CUTTING AND FOLD MARKING TOOL

BACKGROUND OF THE INVENTION

It is already known for sheet material to be cut or indented with fold lines by means of a machine having two oppositely rotating parallel cylinders, one of which constitutes a tool and is provided on its periphery with blades arranged in a desired pattern, while the other has a smooth surface and acts as a counter-cylinder. The present invention is concerned with the construction and manufacture of the first-mentioned cylinder or tool which, for simplicity, may be referred to herein as a tool of the kind described.

It is known in the art for a tool of the kind described to be manufactured by removing the areas intermediate the blades by a chemical or mechanical engraving operation. This procedure suffers from the disadvantage that the edges of the blades must be rounded off following engraving if, in the case of a cutting tool, a clear cut is to be obtained in the web fed into the machine. Furthermore, once the blades have become blunted, the complete tool must be removed and replaced. Scrapping of the complete tool can be avoided by making use of interchangable blades which are held in place by screws, but the operation of replacing the blades is a long and expensive one. It is also known to embed longitudinally rectilinear or transversely arched blades in a layer of synthetic resin on the periphery of the cylinder but it is not possible with this sort of tool to make curved cuts or indentations. Finally, it is known to assemble the tool from a hard core or mandrel upon which is wound an engraved plate. Apart from the fact that there is a saving in material when the blades have become blunted, this type of tool suffers from the same disadvantages as that in which the periphery of a solid cylinder is engraved.

An object of this invention is to provide a tool in which the blades are rendered highly resilient to wear.

Another object of this invention is to provide a tool in which once they have become worn, the blades may be refurbished easily.

A further object of this invention is to provide a tool in which the blades have a configuration which renders them more effective for the cutting or indenting action required of them than in the case of the known blades.

In order to accomplish these objects, the tool in accordance with the invention has cutting or indenting blades formed by covering ribs on a base or core with a layer of hard metal, for example chromium applied by electrodeposition. The ribs may have flat crests upon which the hard metal wearing layer is built up to form a cutting or indenting tip or ridge of rounded or semicircular cross-section. Since the major part of the wear to which the tool is subjected occurs at the tips of the blades, it is preferred for the hard metal wearing layer to be built up to a greater thickness in these regions than elsewhere. The efficiency of the tool may be improved by consolidating this greater thickness of deposited material in a series of substantially hemispherical projections or serrations. It is found that these rounded projections cooperate together to cut or indent the material being worked more effectively than a continuous rounded rib. The ribs may be provided on a solid or tubular cylinder or core or on a plate which is wrapped around such a core. The known techniques for engraving the cylinder or plate may be utilised and the additional electrodeposition step according to the present invention may be carried out very easily thereafter. When the hard coating eventually wears away it may be removed and replaced quite easily so that the tool does not need to be scrapped once it has become worn.

DESCRIPTION OF PREFERRED EMBODIMENT

Figure 1:
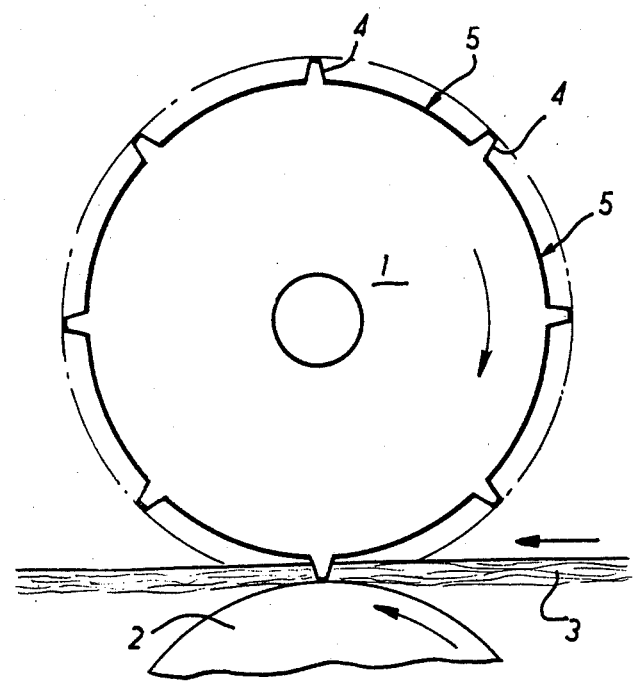
FIG. 1 is a schematic diagram, looking axially, of the cutting and counter cylinders of a cutting machine.

Referring to the drawing, a cutting machine, the remaining parts of which are not depicted, incorporates two parallel cylinders which rotate in opposite directions, namely an upper cutting cylinder 1 and a lower counter-cylinder 2. A web, or a series of superposed webs 3, of paper, card or similarly severable materials, is passed continuously through the nip or gap between the two cylinders and is cut in accordance with a predetermined pattern by projecting blades. In FIG. 1, the wearing surface of the cylinder is omitted so as to depict only the basic form of the core of the cylinder, which is seem to have a series of ribs or teeth 4, each of which is generally of trapezoidal cross-section with two inclined flanks 4a and a flat crest 4b.

Figure 2:
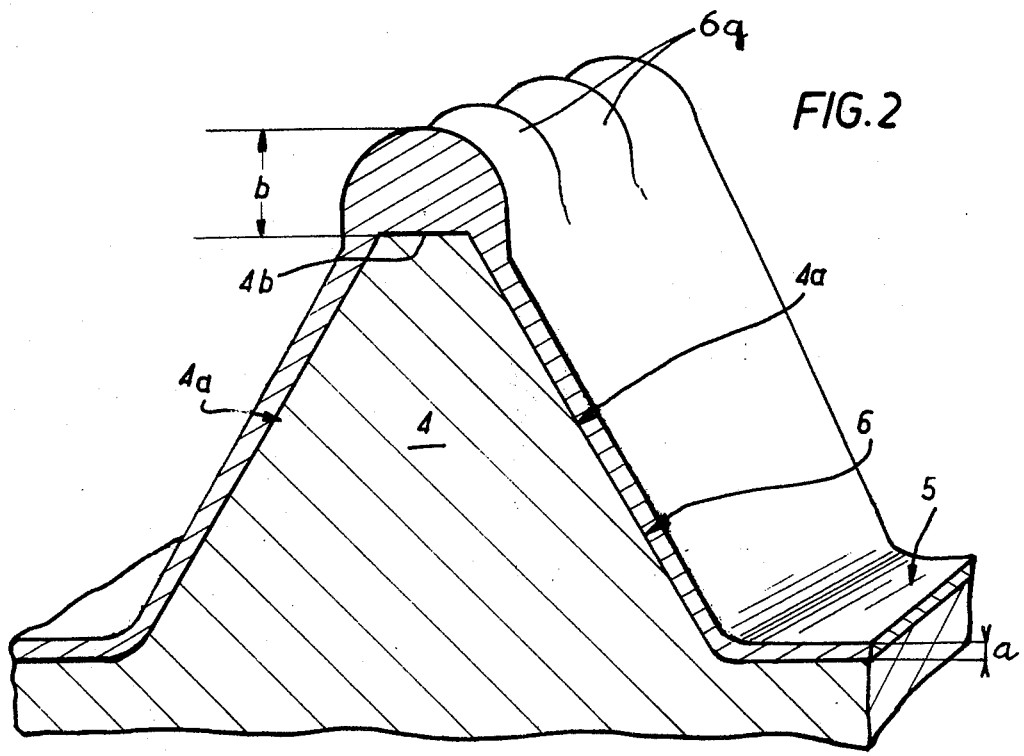
FIG. 2 is a partly sectioned perspective view of one of the cutting blades of the cutting cylinder.

In accordance with the invention, each of the ribs shown in FIG. 1 is provided as shown in FIG. 2 with a wearing surface formed by a thin layer 6 of chromium. This layer has a thickness $a$ in between the ribs and on the flanks or edges thereof which is considerably less than the thickness $b$ of the layer carried by the crest 4b of the rib. This portion of the layer is formed into a ridge of semi-circular cross-section and made up from a series of substantially hemispherical serrations 6a of microscopic dimensions. With this configuration the cutting blades penetrate more readily into the web to be severed.

Without modification and simply by selecting the relative positions of the two cylinders and the pressure applied to them, the cylinders shown in the drawing may be used to indent fold lines into the web 3.

In manufacturing the cutting cylinder, a cylindrical core or a plate intended to be wound onto a core, is etched mechanically, chemically or electrochemically so as to remove material down to a level 5 (FIG. 1) of the surface of the cylinder or plate in between the ribs 4. The etched part is then disposed within an electrolytic bath and is connected into the circuit thereof as the cathode, with the anode being composed of chromium. During the electroplating operation, chromium is deposited to produce the configuration shown in FIG. 2. In a typical example, the ribs 4 had bases of 1mm and crests of 0.1 to 0.15mm and a height of 0.7mm. A chromium layer was applied which had a thickness $a$ of 30 to 40 microns in the regions between the ribs and on the flanks thereof, and a thickness $b$ of 70 microns on the crests 4b.

It was found that after the ridges along the crests of the ribs 4 had become worn, it was very easy to remove the chromium deposit electrically and to reapply it.

Modifications may be made within the spirit and scope of the invention. Thus, although chromium has been given as the preferred metal for the wearing layer, other suitable metals can be employed instead.

I claim:

1. A tool comprising:

a. a generally cylindrical core having means defining a projecting peripheral tooth on an outer surface of said core and extending longitudinally thereof; and b. a metallic wear-resistant layer disposed on said projecting tooth and having a portion having a varying thickness defining a plurality of generally hemispherical serrations jointly defining a serrated edge along a crest of said projecting tooth and extending longitudinally of said tooth.

2. A tool according to claim 1, wherein said projecting tooth has a generally tapezoidal cross section having a base portion adjacent said core and wider than said crest opposite said base portion.

3. A tool according to claim 1, wherein said metallic wear-resistant layer is disposed on said projecting tooth and is disposed on lateral surface portions of said core.

4. A tool according to claim 1, further comprising means defining a plurality of circumferentially spaced projecting peripheral teeth on the periphery of said core and extending longitudinally of said core and spaced circumferentially about a cross section of said core, and a metallic wear-resistant layer disposed on each of the teeth of said plurality of projecting teeth and each having a portion having a varying thickness to define a serrated edge along each tooth of said plurality of projecting teeth and extending generally longitudinally of said core.

* * * * *